Figure 3:
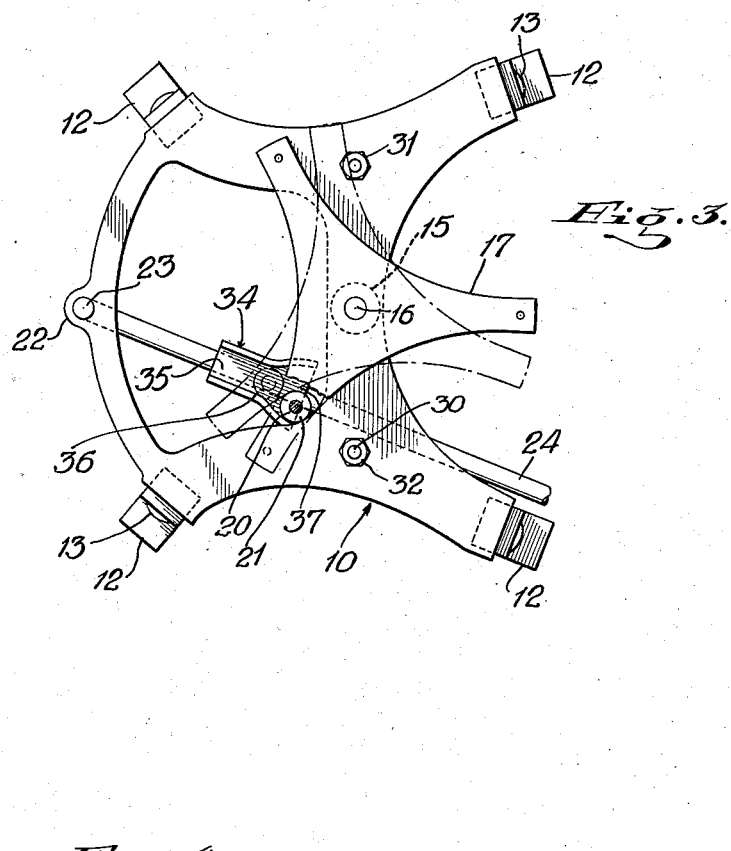

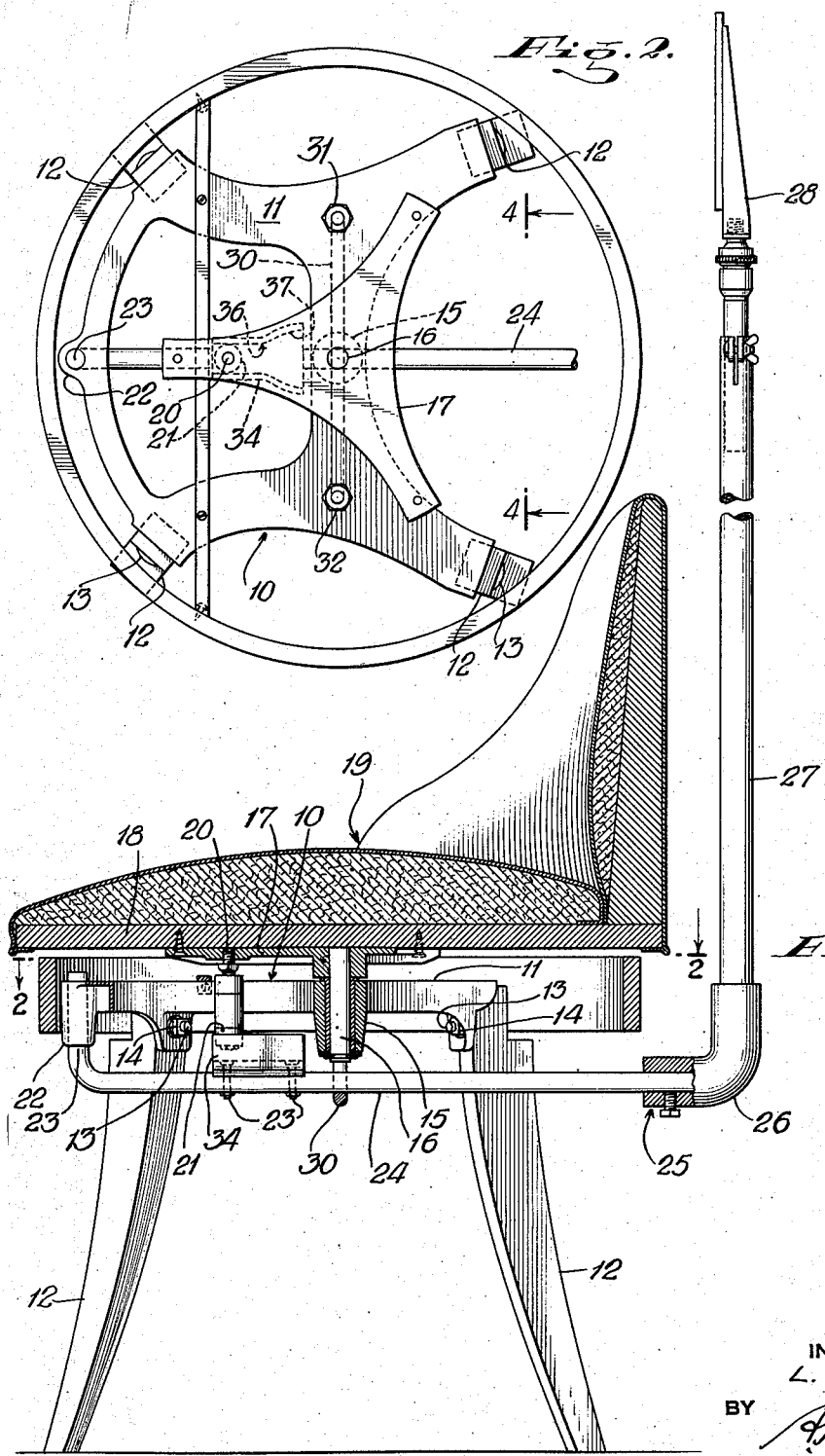

Patented June 6, 1950

2,510,351

UNITED STATES PATENT OFFICE 2,510,351

CHAIR HAVING A MIRROR MOUNTED FOR MOVEMENT WITH THE CHAIR SEAT

Luther G. Simjian, Riverside, Conn.

Application August 26, 1947, Serial No. 770,613

9 Claims. (Cl. 88—92)

This invention relates to a type of chair disclosed in my Patents Nos. 2,218,301 and 2,218,302, wherein I show a chair having a rotatable seat and a pivotally mounted mirror support. Through suitable means, rotation of the seat of the chair effects a rotation of the mirror support, making it possible for a woman sitting on the chair to observe her profile, all as is well set forth in the patents.

In order to obtain sufficient relative movement between the chair and the mirror in the chair shown in each of my patents, it is necessary to mount the mirror support above the legs of the chair, since if the mirror support were to move between the legs of the chair, it would not have sufficient movement imparted thereto. When the mirror is so mounted, the chair seat is spaced a considerable distance from the legs, and the appearance is not entirely satisfactory. Moreover, the construction that must be used is rather complex and costly.

It is the object of my invention to contribute a chair of the particular class in which sufficient relative movement may be imparted to the seat of the chair relatively to the mirror so that a woman sitting on the chair will be able to observe herself in all necessary positions, while limiting the movement of the mirror support to a predetermined degree. Because in my invention the mirror support movement is limited to a predetermined degree as may be determined by the spacing of the legs of the chair, while permitting a compensating seat movement, it is possible to mount the mirror support for movement between the legs of a chair.

As a feature of my invention whereby the objects thereof are attained, I contribute means whereby a mirror support is moved incidental to the movement of the seat of my chair, with the means of connection between the seat and the mirror support being such that the seat may move freely of the mirror support beyond a predetermined position. Because of the particular arrangement, the mirror support will move incidental to the movement of the seat of the chair to a predetermined position, and thereafter will remain stationary while the seat itself rotates.

As a further feature of the invention, the mirror support is locked against movement from its fully rotated position, with the arrangement being such that when the seat returns, it releases the mirror support and then moves it in an opposed direction to an opposed predetermined position.

A still further feature of my invention resides in novel means for mounting the mirror support and for maintaining it in an effective operating position relatively to the chair base. A still further feature of the invention resides in unique means of connection between the seat and the mirror support for contributing an inexpensive and readily adjustable operating connection.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 4:
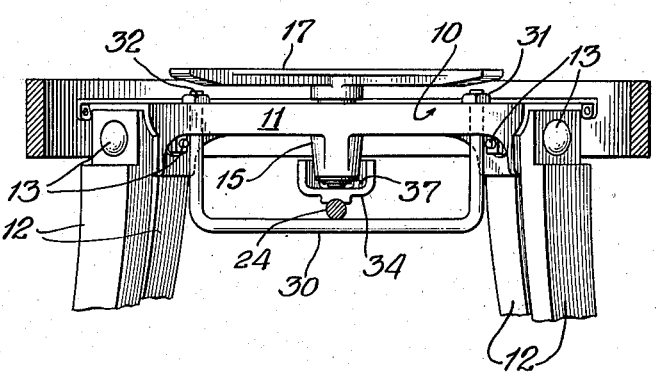

Referring now to the drawings, Fig. 1 is a vertical section through the chair of my invention. Fig. 2 is a view taken along lines 2—2 of Fig. 1. Fig. 3 is a plan view illustrating the coaction of the parts for effecting the movement of the mirror support. Fig. 4 is a section taken along lines 4—4 of Fig. 2.

Referring now more particularly to the drawings, reference numeral 10 refers generally to the base assembly of my chair comprising a casting 11 to which are secured four wooden legs 12 through means of bolts 13 and nuts 14. Casting 11 has a substantially central bearing 15 and this bearing 15 supports for rotation a shaft 16 carried by a plate 17 fixed to the base 18 of the seat assembly 19.

Carried also by the plate 17 is a downwardly depending bolt 20 on which is mounted a suitable roller 21, it being the function of the roller 21 to impart movement to the mirror support assembly in a manner to be described hereinafter.

The base casting 11 is formed with a vertical bearing portion 22 in which rides a vertical part 23 of a rod 24 forming the main portion of what I term the mirror support assembly 25. Secured to the right end of the rod 24 as seen in Fig. 1 is a casting 26, and this casting 26 carries a vertical rod 27 to which is secured a mirror 28 through means conventional in this art.

It will be noted that the rod 24 lies substantially horizontally and between two of the legs 12 of the base assembly of the chair. In view of this arrangement, the movement of the mirror support assembly 25 is naturally limited to a distance determined by the spacing of the legs 12. If the movement of the chair seat assembly 19 were correspondingly limited, there would be insufficient relative movement between the seat and the mirror 28. It will be indicated hereinafter just how I obtain additional relative movement between the seat assembly and the mirror support, while maintaining control of the mirror at all times.

The mirror support assembly 25 is relatively heavy, and the lateral stresses in the bearing 22 would be rather considerable were the mirror support held in position merely through the bearing 22 and the vertical portion 23 of the rod 24. I have devised an extremely simple means for carrying the weight of the mirror support and maintaining it assembled to the chair base and for rotation in the bearing 22. For the particular purpose I utilize a rod 30 extending horizontally beneath the rod 24 as best illustrated in Figs. 3 and 4. The rod 30 has vertically extending portions that are screw threaded and are secured to the base 11 by nuts at 31 and 32 as is quite apparent. It will be noted that the rod 30 is cylindrical and that therefore the contact between it and the rod 24 will be a point contact as the mirror support moves. Because of the particular arrangement, a minimum of friction develops between the two rods.

Secured to the rod 24 of the mirror support by suitable bolts 33 is a cam 34. It will be noted best from Figs. 2 and 3 that the cam 34 has a groove 35 terminating at 36 in a widened groove 37. It is within the groove 35 and the widened groove 37 that the roller 21 operates. As will be seen in Figs. 1 and 2, when the mirror is directly behind the chair back, the roller is at the extreme left end of the narrow groove 35 and holds the mirror in the particular position illustrated. If the chair seat is now moved to its position shown in dash and dotted lines in Fig. 3, the roller 21 will move to the extreme right end of the narrow groove 35. In this position of the parts the mirror support assembly 25 has been moved as far in one direction as it may be moved through the limiting action of the legs 12. However, it is now still possible to move the chair seat assembly 19 counterclockwise to the full line position illustrated in Fig. 3, the roller 21 during this movement moving within the widened groove 37.

During this movement, the roller 21 will merely roll relatively to one of the walls of wide groove 37, but will not impart movement to the cam 34. Therefore, during the movement of the seat assembly 19 from its dash and dotted line position of Fig. 3 to its full line position of Fig. 3, the mirror support assembly will remain stationary, but the seat will move considerably. Of course, when the seat is rotated in a reverse direction, the relationship of the parts will be reversed, but again the seat will move after the mirror support has moved to its extreme opposed position and is no longer movable.

It will be noted from Fig. 3 that while the seat assembly 19 moves to its full line position, the roller 21 coacts with a wall of the wide groove 37 of the cam 34 for locking the mirror support assembly 25 against movement away from its extreme position. In this way the mirror support assembly is held against movement while the chair seat assembly moves. Also, the parts are always maintained in proper relation for the re-entry of the roller 21 into the narrow groove 35 of the cam 34 for reversing the direction of movement of the mirror support.

I believe that the operation and contribution of my invention will now be understood by those skilled in the art.

I now claim:

1. A variable image-observing device for use in conjunction with an observing-mirror and comprising a base, a seat rotatable relatively to said base and having a seating surface, a movable mirror support having a mirror thereon movable back of the seating surface of said seat and on the side thereof opposite the aforesaid observing-mirror, means on said seat and on said movable mirror support coacting so that rotation of said seat effects rotatation of said mirror support during rotation of said seat from one position to a second position, and said coacting means on said seat being constructed to be functionally independent of said means on said movable mirror support when said seat rotates beyond said second position to a third position whereby not to move said movable mirror support beyond the position to which it is moved incidental to movement of said seat to said second position.

2. A variable image-observing device for use in conjunction with an observing-mirror and comprising a base, a seat rotatable relatively to said base and having a seating surface, a movable mirror support having a mirror thereon movable back of the seating surface of said seat and on the side thereof opposite the aforesaid observing mirror, coacting cam means on said seat and mirror support operated by rotation of said seat from one position to a second position for moving said mirror support, the said coacting cam means on said seat and on said mirror support being constructed to be functionally independent when said seat rotates beyond said second position whereby not to effect movement of said mirror support beyond said second position.

3. A variable image-observing device for use in conjunction with an observing-mirror and comprising a base, a seat rotatable relatively to said base and having a seating surface, a movable mirror support having a mirror thereon movable back of the seating surface of said seat and on the side thereof opposite the aforesaid observing-mirror, means of connection on said seat and on said mirror support actuated by rotation of said seat from one position to a second position for moving said mirror support, and said means of connection on said seat being constructed to separate functionally from the means of connection on said mirror support when said seat moves to said second position whereby said seat rotates beyond said second position without consequent movement of said mirror support beyond said second position.

4. A variable image-observing device for use in conjunction with an observing-mirror and comprising a base, a seat rotatable on said base and having a seating surface, a mirror support having a mirror thereon movable back of the seating surface of said seat and on the side thereof opposite the aforesaid observing-mirror, means pivotally mounting said mirror support on said base, cooperating cam means on said seat and mirror support whereby rotation of said seat between predetermined positions moves said mirror support on its mounting, the said cam means being formed for functional separation when said seat moves beyond said predetermined positions whereby said seat movement beyond said predetermined positions is free of said mirror support.

5. A variable image-observing device for use in conjunction with an observing-mirror and comprising a base, a seat rotatable on said base and having a seating surface, a mirror support having a mirror thereon movable of the seating surface of said seat and on the side thereof opposite the aforesaid observing-mirror, means pivotally mounting said mirror support on said base, cooperating cam means on said seat and mirror support comprising a cam and groove whereby rotation of said seat between predetermined positions moves said mirror support on its mounting, the said cam and groove being formed for functional separation when said seat moves beyond said predetermined positions whereby said seat movement beyond said predetermined positions is free of said mirror support.

6. A variable image-observing device for use in conjunction with an observing-mirror and comprising a base, legs supporting said base, a seat rotatable on said base and having a seating surface, a mirror support having a mirror thereon movable back of the seating surface of said seat and on the side thereof opposite the aforesaid observing-mirror, means pivotally mounting said mirror support on said base with a part thereof between two of said legs and for movement between predetermined positions determined by the spacing of said legs, cooperative means on said seat and mirror support whereby rotation of said seat between predetermined positions moves said mirror support on its mounting, the said means terminating for functional separation when said seat moves beyond said predetermined positions whereby said seat movement beyond said predetermined positions is free of said mirror support.

7. A variable image-observing device for use in conjunction with an observing-mirror and comprising a base, a seat rotatable on said base and having a seating surface, a mirror support having a mirror thereon movable back of the seating surface of said seat and on the side thereof opposite the aforesaid observing-mirror, means pivotally mounting said mirror support on said base, cooperating cam means on said seat and mirror support comprising a cam and groove whereby rotation of said seat between predetermined positions moves said mirror support on its mounting, the said groove widening for functional separation from said cam when said seat moves beyond said predetermined positions whereby said seat movement beyond said predetermined positions is free of said mirror support, and the widened portion of said groove coacting with said cam to inhibit movement of the mirror support from one of said predetermined positions thereof toward the other during rotation of the seat beyond said predetermined positions.

8. A variable image-observing device for use in conjunction with an observing-mirror and comprising a base, a seat rotatable relatively to said base and having a seating surface, a mirror support comprising a horizontal arm and a pair of vertical portions, a vertical bearing for one of said vertical portions formed on said base for mounting said mirror support for pivotal movement on said bearing with said horizontal arm moving in a horizontal plane under said base and with the other of said vertical portions extending upwardly beyond said base and having a mirror thereon movable back of the seating surface of said seat and on the side thereof opposite the aforesaid observing-mirror, a grooved cam member secured to said horizontal arm, a cam extending from said seat and lying in the groove of said grooved cam member for moving said mirror support on said bearing as said seat is rotated, and said groove widening at one end thereof whereby said seat and its cam rotate without consequent movement of said mirror support when said seat rotates beyond a predetermined position.

9. A variable image-observing device for use in conjunction with an observing-mirror and comprising a base, legs supporting said base, a seat rotatable on said base and having a seating surface, a mirror support having a mirror thereon movable back of the seating surface of said seat and on the side thereof opposite the aforesaid observing-mirror, means pivotally mounting said mirror support on said base with a part thereof between two of said legs for movement between predetermined positions determined by the spacing of said legs, cooperating cam means on said seat and mirror support comprising a cam and groove whereby rotation of said seat between predetermined positions moves said mirror support on its mounting, the said groove terminating for functional separation from said cam when said seat moves beyond said predetermined positions whereby said seat movement beyond said predetermined positions is free of said mirror support.

LUTHER G. SIMJIAN.

REFERENCES CITED

The following references are of record in the file of this patent:

UNITED STATES PATENTS

| Number | Name | Date |
|---|---|---|
| 232,461 | Coolbaugh | Sept. 21, 1880 |
| 561,681 | Miller | June 9, 1896 |
| 1,609,292 | Burch | Dec. 7, 1926 |
| 1,618,985 | Kelley et al. | Mar. 1, 1927 |
| 1,622,486 | Bourdon | Mar. 29, 1927 |
| 2,067,983 | Rice | Jan. 19, 1937 |
| 2,161,263 | Simjian | June 6, 1939 |
| 2,218,301 | Simjian | Oct. 15, 1940 |
| 2,218,302 | Simjian | Oct. 15, 1940 |
| 2,224,579 | Wheelan | Dec. 10, 1940 |
| 2,329,240 | Bendon et al. | Sept. 14, 1943 |
| 2,378,937 | Leeds | June 26, 1945 |
| 2,399,676 | Holschuh et al. | May 7, 1946 |